United States Patent
Christensen et al.

(10) Patent No.: US 7,905,356 B2
(45) Date of Patent: Mar. 15, 2011

(54) METHOD FOR SEPARATION OF HETEROGENEOUS PRODUCTS, INCLUDING HOUSEHOLD WASTE

(75) Inventors: Borge H. Christensen, Ålsgårde (DK); Lena H. Christensen, Helsingør (DK)

(73) Assignee: Holm Christensen Biosystemer APS, Alsgarde (DK)

(*) Notice: Subject to any disclaimer, the term of this patent is extended or adjusted under 35 U.S.C. 154(b) by 608 days.

(21) Appl. No.: 11/883,464

(22) PCT Filed: Jan. 31, 2006

(86) PCT No.: PCT/DK2006/000050
§ 371 (c)(1),
(2), (4) Date: Nov. 6, 2007

(87) PCT Pub. No.: WO2006/079347
PCT Pub. Date: Aug. 3, 2006

(65) Prior Publication Data
US 2008/0302706 A1    Dec. 11, 2008

Related U.S. Application Data

(60) Provisional application No. 60/647,807, filed on Jan. 31, 2006.

(30) Foreign Application Priority Data

Jan. 31, 2005  (EP) ..................... 05001915

(51) Int. Cl.
*B03B 5/60* (2006.01)
*B03B 5/64* (2006.01)
*B03D 1/00* (2006.01)

(52) U.S. Cl. .......... 209/163; 209/18; 209/155; 209/162; 209/172.5; 209/173; 209/930; 209/639; 209/644; 209/44.2; 209/615

(58) Field of Classification Search ............... 209/18, 209/155, 162, 163, 172.5, 173, 930, 639, 209/644, 44.2, 615
See application file for complete search history.

(56) References Cited

U.S. PATENT DOCUMENTS

| 2,621,791 A |   | 12/1952 | Bitzer |          |
| 2,877,896 A | * | 3/1959  | Jones  | 209/172.5 |
| 3,568,839 A | * | 3/1971  | Dunlea | 210/194  |

(Continued)

FOREIGN PATENT DOCUMENTS

CN    1520932    8/2004

(Continued)

*Primary Examiner* — Stefanos Karmis
*Assistant Examiner* — Prasad V Gokhale
(74) *Attorney, Agent, or Firm* — Muncy, Geissler, Olds & Lowe, PLLC

(57) ABSTRACT

A method for separation of heterogeneous products included in household waste (HW) comprises separating the products in a fractionation vessel containing a liquid. The waste includes components, of which at least some are capable of floating in the liquid. The components are exposed to a first essentially horizontal force (P1) in a first direction (D1) enforced by a flow of the liquid in the fractionation vessel and to a second essentially horizontal force (P2) in a second direction (D2), which is substantially different from the first direction (D1). The combined impact of the forces (P1; P2) on the components spreads the components and leads them to at least two collection areas. Products of varying buoyancy may thus be treated separately.

19 Claims, 2 Drawing Sheets

U.S. PATENT DOCUMENTS

| | | | |
|---|---|---|---|
| 3,817,458 A | | 6/1974 | Gilberto |
| 4,250,026 A | * | 2/1981 | Giddings et al. .............. 209/155 |
| 4,357,154 A | * | 11/1982 | Hartung .......................... 65/454 |
| 4,438,851 A | | 3/1984 | Voelskow ...................... 209/616 |
| 4,858,769 A | * | 8/1989 | DeVries ........................ 209/3.1 |
| 4,968,418 A | * | 11/1990 | Rohr ............................. 209/430 |
| 6,994,221 B2 | * | 2/2006 | Tse ................................ 209/663 |
| 7,017,753 B2 | * | 3/2006 | Tse ................................ 209/162 |
| 2003/0141225 A1 | | 7/2003 | Liddle et al. |
| 2004/0226865 A1 | * | 11/2004 | Tse ............................... 209/12.1 |
| 2008/0217213 A1 | * | 9/2008 | Smith et al. ................. 209/172.5 |

FOREIGN PATENT DOCUMENTS

| | | |
|---|---|---|
| CN | 1520932 A | 8/2004 |
| DE | 3202110 A1 * | 7/1983 |
| DE | 37 17 839 A1 | 12/1987 |
| DE | 41 20 808 A1 | 1/1993 |
| DK | 41 20 808 A1 | 1/1993 |
| EP | 0476 028 B1 | 3/1992 |
| EP | 0 521 685 A2 | 1/1993 |
| EP | 0 644 166 A2 | 3/1995 |
| EP | 0 476 028 A1 | 4/1996 |
| GB | 1 562 266 | 3/1980 |
| GB | 1 562 266 A | 3/1980 |
| NL | 23 746 C | 3/1931 |
| NL | 23746 | 3/1931 |
| WO | WO-2004/101183 A | 11/2004 |
| WO | WO-2004/101183 A2 | 11/2004 |

* cited by examiner

US 7,905,356 B2

METHOD FOR SEPARATION OF HETEROGENEOUS PRODUCTS, INCLUDING HOUSEHOLD WASTE

This National Phase application claims priority under 35 U.S.C. 119(e) to U.S. Provisional Application No. 60/647,807 filed on Jan. 31, 2005 and under 35 U.S.C. 119(a) to Patent Application No. 05001915.7 filed in Europe on Jan. 31, 2005. Both of these prior applications are hereby expressly incorporated by reference into the present application.

FIELD OF THE INVENTION

The invention relates to a method and an apparatus for fractionation of heterogeneous products composed of components of which at least some will float when transferred into a liquid. The method has the capacity to separate heterogeneous products in different fractions, in particular to separate a floating fraction in at least two fractions in one separation vessel. An example of a heterogeneous product is household waste (HW) which contains so many components with different properties that it can be separated in up to 5-10 fractions in one separation vessel. The largest fraction of the HW will normally be biomass waste (BW) composed of food residues, paper, paperboard etc. and containing a major part of the energy in the HW. Another important energy containing fraction is plastic and other organic polymers, which according to preferred embodiments of the invention can be sorted out for recycling. Household waste refers to the mixed waste collected door to door on a regular basis from households and other sources. Biomass waste (BW) refers to the biodegradable fraction of HW.

PRIOR ART

Disposal of waste is a big problem everywhere in the urban societies. Disposal of waste is performed in the following ways:
Landfill
Incineration with or without energy recovery
Recycling of certain components based on source separation
Central composting or biogas production of BW The disadvantages by landfill are large demand for land area, emissions of methane and other greenhouse gasses, and leaching of problematic compounds to the soil and ground water. Furthermore the lack of recovery of the resources tied up in the HW will be unacceptable in the future. This is reflected in the EU landfill directive (Counsil Directive 1999/31/EC) according to which member states are obliged to set up national strategies to reduce biodegradable waste going to landfill.

Central composting reduces the volume of the waste, but there is hardly any recovery of the resources in the HW.

Incineration also implies landfill of the non combustible components, but the land area required is a lot smaller. Recovery of the energy from the HW can take place, but it is not optimal. There are problems with emission to the air (dioxin, heavy metals etc), which are very costly to solve. Establishment of a state of the art HW incineration plant with energy recovery requires investments, which per kW are 4-5 times higher than the investments in central combined heat and power (CHP) plants. In order to compensate for this, the HW incineration plants normally receive a tipping fee of around 50 Euro/t HW.

Recycling based on source separation exists in many versions. The best results are achieved by sorting out fractions, that are easily recognized and recycled, e.g. glass bottles and newspapers. Sorting out a biodegradable fraction for fermentation to biogas has proven difficult. Errors in sorting lead to production difficulties at the biogas plants, and it is expensive to collect waste in several fractions. Furthermore the substances that are regarded as harmful stay in the biogas sludge, which makes it difficult to dispose of the sludge in a suitable way.

Source separation of household waste combined with biogas production has been established in industrial scale in Denmark, using gasmotors to convert the biogas to electricity. Hereby it has been demonstrated, that the energy recovery is at the same level or lower than at incineration plants with electricity production, and that the disposal costs are 3-5 times higher.

A central, automatic separation of waste after collection without disintegration (hereafter called central separation, in contrast to source separation) means that a lot more of the waste can be recycled and at the same time, the energy in the BW fraction can be utilized more efficiently, when the non-BW fractions has been removed. It is important that the central separation method can separate the organic fraction in synthetic polymers and BW, since plastic usually has a higher value as material than as fuel.

Separation methods for products, which like HW consist of many different components will usually be conducted in several steps, since one sorting step will normally not produce the required number of fractions with sufficient purity. Every separation step means substantial additional costs, and therefore separation methods which provide many fractions in one step early in the separation process would be an advantage. In order to achieve the highest price for the separated fractions it is desirable, that the fractions are as clean as possible, and that hazardous substances are isolated and not spread into the other fractions.

Most separation methods have a shredding step before the first sorting step. A few methods, like a preferred embodiment of the method according to the invention do not begin with a shredding step, but apply means for opening sacks and bags.

Most separation methods are dry, but a few use water as the separation media, like a preferred embodiment of the method according to the invention.

Some of the known wet separation equipment like that disclosed in EP 1 134 021 A2 includes modified centrifuges.

It is known to transfer heterogeneous products into a flow of liquid and separate in fractions which sink, dissolve or float.

The methods using this principle can be divided in two groups. One group where the heterogenous product is shredded, pulped or in other ways disintegrated before separation, and one group where the product is just released from bags and sacks.

Examples from the first group are disclosed in: EP 0 476 028 B1, DE 37 17 839 A1, EP 0 644 166 A2, EP 0 521 685 A2, U.S. Pat. No. 3,817,458, DE 41 20 808 A1, U.S. 2003/0141225 A1. All methods using disintegration before separation have the following problems in common.

The disintegration will destroy components, which could have been reused after cleaning e.g. standard wine bottles.

The disintegration will complicate further separation e.g. in different plastic types, white glass from coulored glass.

The disintegration will mix and integrate the components which later have to be separated e.g. plastic and biomass.

The disintegration will spread problematic substances e.g. heavy metals from batteries into the remaining portions of the product.

Disintegration in the form of pulping will lead to high viscosity, which complicates the separation of components such as plastic from the BW.

Examples from the second group are disclosed in U.S. Pat. No. 6,213,306 which describes a process where the product without disintegration is dropped into a flow of liquid to select heavy components. The refuse is thereafter disintegrated before further wet separation in following float and sink units. U.S. Pat. No. 5,104,047 also describes initial selection of heavy components followed by disintegration of the floating fraction in a hammermill. A centrifuge will separate the milled solid waste from the liquid which will be recycled. EP 1 216 924 A2, describes a very effective bagsplitter which can be followed by a wet separator producing two fractions.

None of the methods are capable of separating into more than three fractions and separate the floating fraction in one separation vessel.

None of the known wet central separation methods have been able to compete with incineration of unseparated HW, one reason being they can only separate in maximum three fractions with one separation vessel, which do not provide enough added value to justify the extra costs for water treatment.

SUMMARY OF THE INVENTION

In a broadest aspect, the present invention provides a method for separation of heterogeneous products included in household waste (HW), wherein the products are separated in a fractionation vessel containing a liquid, whereby the waste includes components, of which at least some are capable of floating in the liquid; and in that:
  the components are exposed to a first essentially horizontal force (P1) in a first direction (D1) enforced by a flow of the liquid in the fractionation vessel and to a second essentially horizontal force (P2) in a second direction (D2), which is substantially different from the first direction (D1); and in that:
  the combined impact of the forces (P1; P2) on the components spreads the floating components and leads them to at least two collection areas.

Preferred embodiments of the method according to the invention provides a new type of wet separation that utilizes differences in the behaviour of the various components in a flow of liquid to produce a number of fractions, usually at least 3 but typically 6-10, from one separation vessel. The fractions can subsequently be separated further by known means, to provide a high degree of recycling of components and materials.

It is an object of preferred embodiments of the invention to create a central automatic separation method for heterogeneous products such as HW, which provides:
 1. The possibility to adjust the separation process in accordance with the composition of the product and the market situation.
 2. Efficient recovery of the biomass waste (BW), separated in at least two fractions, of which one is liquid and at least one is solid, which provides very good opportunities for value added utilisation of the BW fractions such as ethanol fermentation feedstocks using both the liquid and the solid fraction, or using the solid fraction after communition, mechanical dewatering and drying as solid biofuel. The solid biofuel can be incinerated without the problems with emission to air which are known by incineration of mixed waste. This will both reduce the costs for incineration and improve the energy efficiency, compared to mixed waste incineration. Separation of the BW in a liquid and a solid fraction has the consequence that salts, which pose a problem by incineration at high temperatures and high electricity efficiency, can be removed from the solid biofuel.
 3. Efficient recovery of non-BW components with the capacity to separate in at least two floating fractions and one sinking fraction typically three to six floating fractions and one to three sinking fractions.
 4. Very good opportunities for economical recycling of the non BW fractions by further separation into reusable components and materials with well defined specifications,
 5. Overall economy which can compete with incineration of mixed HW.

Preferred embodiments of the method according to the invention benefit from the fact that, when a heterogeneous product like HW, which has not been disintegrated is dropped into a liquid, some air will be trapped in many components and enable them to float, even if they consist of a material with a specific density higher than that of the liquid. After a short time in the liquid, the components will float in characteristic positions relative to the surface, which is exploited in the method according to the invention.

The components included in the household waste may include first components having a first buoyancy in the liquid, and second components having a second buoyancy in the liquid, the first buoyancy being different from the second buoyancy, whereby products of different buoyancy may be treated differently, i.e. influenced by different forces.

For example, the components may include substantially undamaged components, which can be classified in at least some of the following fractions:

F0: components that are so heavy that they cannot float, such as glass porcelain, batteries and kitchen utensils;

F1: components that are dissolvable or dispersable, e.g. sugar, salt, tissue paper and food residues;

F2: components that are capable of floating with a major part thereof under the surface of the flowing liquid, but close to the surface, e.g. plastic foils and newspapers;

F3: components that are capable of floating with major part thereof under the surface of the flowing liquid and reach deeper under the surface than F2 and F4, e.g. glass bottles and shoes;

F4: components that are capable of floating with a substantial part thereof above and a substantial part below the surface of the flowing liquid, e.g. glass jars with lid and cartons filled with other waste;

F5: components that are capable of floating with a major part thereof above the surface, e.g. empty plastic bottles and beer cans;

Many components will have floating characteristics between the above mentioned. They will be named F1-F2, F2-F3 and so forth.

The variations in the floating characteristics of the components (F1-F5) make it possible to spread them, and thereby take out several fractions, in contrast to the known methods where all floating components are collected as one fraction.

The spreading of the floating components is carried out by combining a force P1 with the direction D1 enforced by the flow of a liquid in a fractionation vessel with a force P2 above the liquid in the direction D2, which is different from D1. The F1-F5 components will be influenced from the forces P1 and P2 to different extents, ranging from P2 having no impact on F1 to a dominating impact on F5, whereas P1 is dominating the movement of F1 and has almost no effect on F5.

Together with the vertical forces of gravitation and buoyancy, the horizontal forces P1 and P2 form a three dimensional system, which gives more spreading and hence the possibility to take out more fractions than it is possible from one separation step by the known wet separation methods, most of which will only spread the components in two dimensions.

It will be appreciated that the first and second forces (P1; P2) may act on those components, which are capable of floating in the liquid, i.e. which are buoyant in the liquid.

In one embodiment, the components of the household waste are exposed to the first and second essentially horizontal forces (P1; P2) simultaneously. Thus, an efficient system and method is provided, in which products of e.g. different buoyancy may be treated at the same time, e.g. at different levels in the liquid.

The second force (P2) may be applied above the surface of the liquid. It may e.g. be provided by an air flow and/or water jets and/or by mechanical means.

To increase spreading of the components, the F1-F5 components may be exposed to a force P3 below the surface with the direction D3 acting in one or different depths. D3 is different from D1 and D2. P3 can e.g. be provided by mechanical means.

Some components, especially F3 components such as glass bottles are floating high and horizontally, until a certain time has elapsed, after which liquid flowing into the components force them to turn into a vertical position and a deeper floating. This behaviour can be exploited to separate such components from components without changing floating characteristics.

Preferred embodiments of the separation method according to the invention implies that one or several of the above mentioned fractions can be removed from the liquid in a manner that separates them further. One example is separating plastic foils and textiles from paper and food residues by a collection device with reciprocating barbed needles, which penetrate the components of fraction F2 in the downward movement, and which withdraw plastic foils and textiles in the upward movement. The plastic foils and textiles are removed from the barbed needles when they are in their top position.

The fractions can also be separated further when they have left the separation vessel. One example is that F1 and F2 are transferred to a continuous hydrothermal pressurized treatment, separating the biomass fractions into a solid fraction low in alkali chlorides and a liquid fraction.

An improved spreading of F0-F5 can be achieved by exposing the falling product to an airflow or water jets with the direction D2. F5 components will be taken the furthest by the air flow in the direction D2, F4 a little shorter, while most F0-F3 hardly will be affected of the air flow or water jets.

It can be an advantage if the product is moisturized, before or after the product is transferred to the liquid flow.

In order to recycle components and materials in an economical viable way, it is desirable to create many fractions with a high purity at low costs. For example a plastic fraction with only one or two types of plastic will have a significant higher value than a plastic fraction which comprises all types of plastic. Embodiments of the method according to the invention can, at very low extra costs, sort out big plastic bottles and vessels, which are mainly made of uncoloured translucent plastic, from smaller bottles, which are typically made from coloured plastic (plastic bags will automatically be in another fraction). Although the fraction with the big plastic bottles will not be 100% clean when it leaves the separation vessel, it will be a lot easier and cheaper to create a fraction with sufficient purity to achieve a high price, than if the plastic bottles had not been separated according to their size.

DESCRIPTION OF THE DRAWINGS

Preferred embodiments of the invention will now be described with reference to the drawings, in which:

FIG. 1

If the heterogeneous product or some of it is contained in bags or sacks, it should preferably be released (1) without essential damage to the components. Then an even stream of the product is produced on a conveyor (2). The heterogeneous product falls into a separation vessel (3) wherein there is a flow of liquid. The product lands in the feeding area (4), where all components are exposed to the force P1 produced by the liquid flow in the direction D1.

Components (F0) which are affected more by gravity than by buoyancy sink to a collection area directly under the feeding area or close to it (4), where the fraction F0 is taken out by known means.

Some components (F3-F5) float with a part of the component above the surface. This part of the component is affected by the force P2 in the direction D2.

Figure 1:
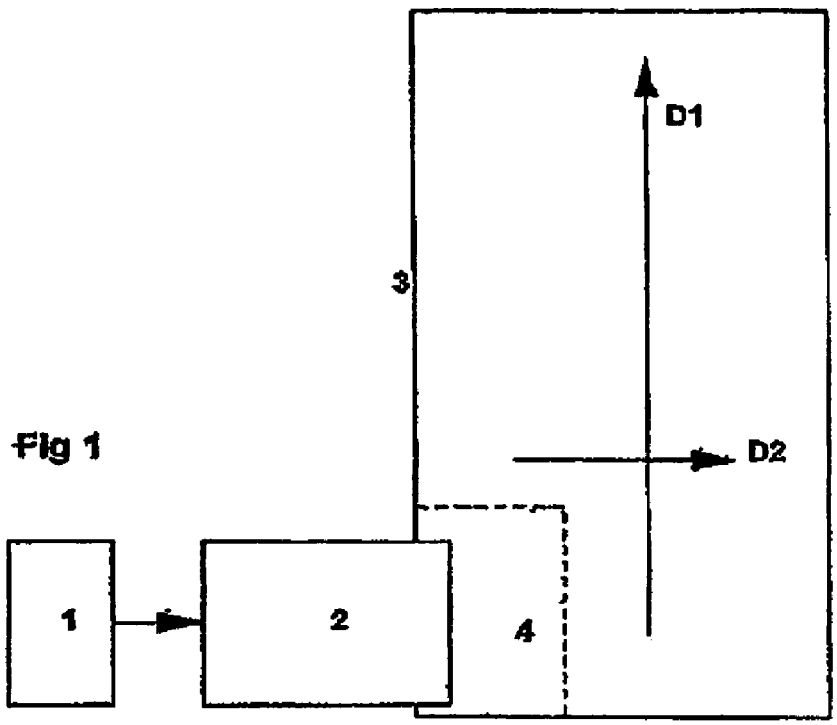
FIG. 1 shows the principle of the invention in plan projection.

In FIG. 1 P2 is provided by a flow of air or jets of liquid.

FIG. 2

The simultaneous provision of P1 in the direction D1 and P2 in the direction D2 spreads the F1-F5 components along two edges of the separation vessel (3).

FIG. 3

The forces P1 and P2 acting in the directions D1 and D2 are the same as in FIG. 1. The subsurface force P3 with the direction D3 has the opposite direction of D2, which will spread the components along one more edges of the separation vessel (3).

FIG. 4

Figure 2:
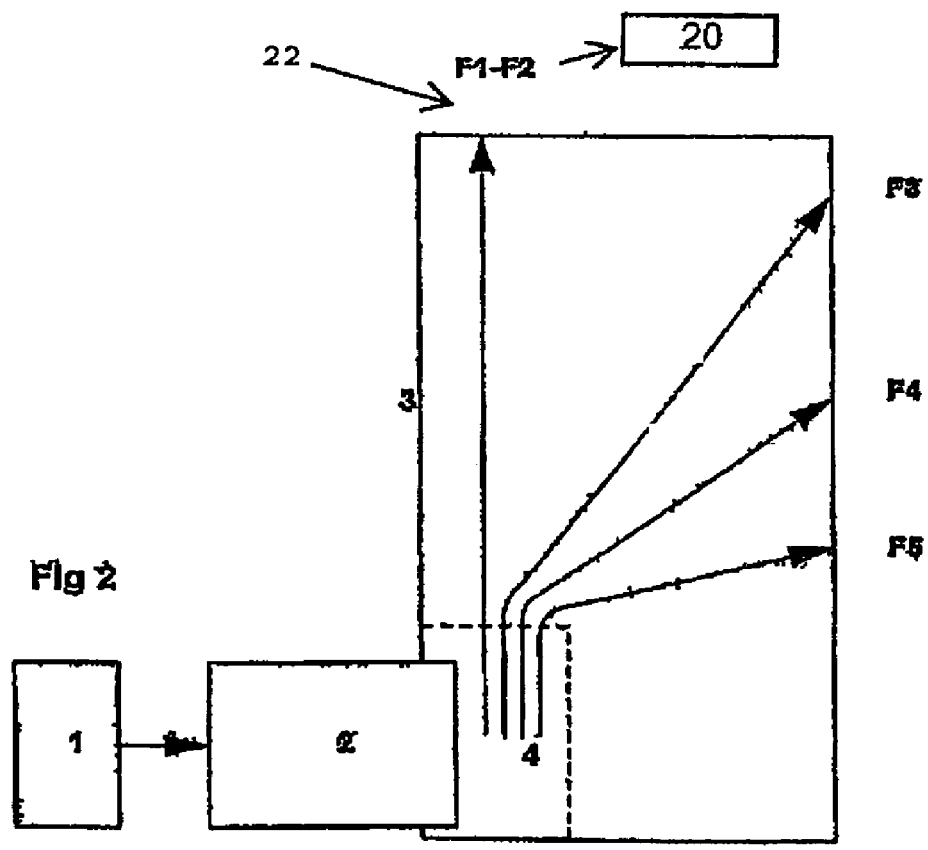
FIG. 2 shows how the fractions will spread according to the principle illustrated in FIG. 1.
Figure 3:
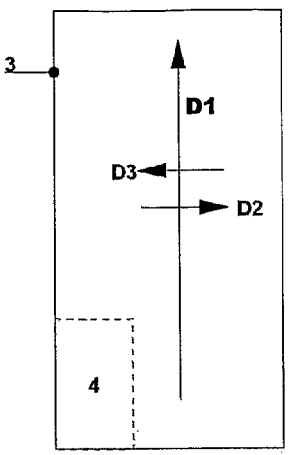
FIG. 3 shows the directions D1-D3 by a preferred embodiment of the invention.
Figure 4:
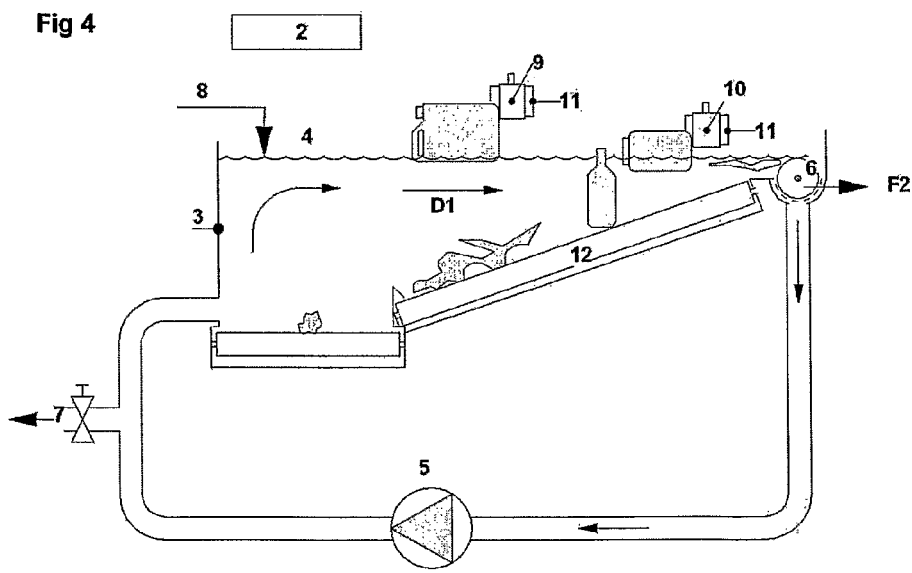
FIG. 4 shows the embodiment of FIG. 3 in a longitudinal section.
Figure 5:
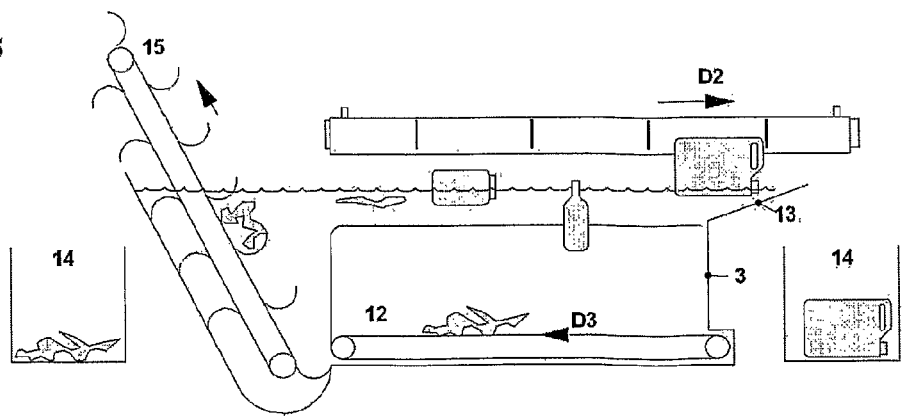
FIG. 5 shows the same embodiment as FIGS. 3 and 4 in cross section.

The heterogeneous product is transferred into a separation vessel (3) and will be affected by P1 and P2 as previously described. The flow of liquid that provides P1 with the direction D1 is provided by circulating the liquid by means of a recycling pump (5), introducing the liquid into the separation vessel close to the product input (4). In the shown embodiment F1 and F2 are taken out together with the liquid through a screw strainer (6), which separates F1 and the liquid from F2. Some of the liquid and F1 follow F2. If the amount of liquid and F1 leaving the system in this way is not sufficient to avoid too high viscosity in the liquid, a bleed of F1 (7) can be taken out downstream of the recycling pump (5). In order to maintain the same level of liquid in the separation vessel, liquid is added (8). Fractions can also be separated further when they have left the separation vessel (3). One example is that F1 and F2 are transferred to a continuous hydrothermal pressurized treatment (20) as indicated in FIG. 2, separating the biomass fractions into a solid fraction low in alkali chlorides and a liquid fraction. In addition, plastic foils and textiles can be separated from paper and food residues by collection device (22) which, has reciprocating barbed needles, which penetrate the components of fraction F2.

P2 with the direction D2 is in this embodiment of the invention provided by conveyers (9 and 10) with vertical flaps (11). The conveyers have different heights over the surface, the highest conveyor (9) being nearest to the feeding area. This conveyer primarily takes out F5 components. The lower conveyer (10) primarily takes out F4 components. There can be more than 2 conveyors.

A slanting belt conveyor (12) is in contact with the floating components (F3-F4) at different depths under the surface and provide the force P3 in the direction D3.

The belt conveyor (12) is placed with the deepest end closest to the feeding area (4).

FIG. 5

The components taken out by P2 in the direction D2 are pushed over the slanting edge (13) by the flaps (11) of the conveyer (9 and 10), and transferred into containers (14) or to conveyers moving them to further separation.

The components taken out by P3 in the direction D3 fall from the slanting belt conveyor (12) into an elevation conveyer (15), which lifts them out of the separation vessel (3) and transfer them into containers (14) or to conveyers moving them to further separation.

The invention claimed is:

1. A method for separation of heterogeneous products included in household waste (HW), wherein household waste (HW) including said products is conveyed to a fractionation vessel containing a liquid, and in that the products are separated in the fractionation vessel, the waste including components, of which at least some are floatable in the liquid, whereby the components at least include first components having a first buoyancy in the liquid and second components having a second buoyancy in the liquid, the first buoyancy being different from the second buoyancy; wherein said heterogeneous products include components from at least some of the following fractions:

F0: components that are so heavy that they cannot float;
F1: components that are dissolvable or dispersible;
F2: components that are floatable with a major part thereof under the surface of the flowing liquid, but close to the surface;
F3: components that are floatable with major part thereof under the surface of the flowing liquid and reach deeper under the surface than F2;
F4: components that are floatable with a substantial part thereof above and a substantial part below the surface of the flowing liquid;
F5: components that are floatable with a major part thereof above the surface;
and wherein the method comprises:
exposing said components to a first essentially horizontal force (P1) in a first direction (D1) enforced by a flow of the liquid in the fractionation vessel and to a second essentially horizontal force (P2) in a second direction (D2), which is substantially different from the first direction (D1); and
the combined impact of the forces (P1; P2) on the components and the different buoyancies of the components causing the first and second components to be influenced by different resulting forces, so as to spread the first and second floating components and lead them to at least two respective collection areas;
wherein the heterogenous products include F4 and F5 components and wherein the F4 and F5 components are affected above the surface of the liquid by forces (P2) applied at different heights above the surface of the liquid.

2. A method according to claim 1, wherein the second force (P2) is enforced by at least one of mechanical means, by one or more water jets and by an airflow.

3. A method according to claim 1, wherein one or several of the fractions, which have been lead to collection areas by said forces are separated further by collection devices.

4. A method according to claim 1, wherein one or several of the separated fractions are subsequently separated further.

5. A method according to claim 1, wherein a feeding system for feeding the components into the vessel comprises a dosing device arranged above the vessel, so that the components fall from the dosing device to the surface of the liquid, and wherein the components are exposed to an airflow or water jet in the second direction (D2) during the fall.

6. A method according to claim 1, wherein the heterogeneous products include F0-F5 components and wherein some of the liquid will be withdrawn together with the fractions F0-F5 and the rest of the liquid is recycled from a liquid outlet of the vessel back into a liquid inlet of the vessel.

7. A method according to claim 1, wherein
the F0 components include at least one of glass porcelain, batteries and kitchen utensils;
the F1 components include at least one of sugar, salt, tissue paper and food residues;
the F2 components include at least one of plastic foils and newspapers;
the F3 components include at least one of glass bottles and shoes;
the F4 components include at least one of glass jars with lid and cartons filled with other waste; and
the F5 components include at least one of empty plastic bottles and beer cans.

8. A method according to claim 7, wherein the first and second forces (P1; P2) act on those components, which are floatable in the liquid.

9. A method according to claim 8, wherein said components are exposed to the first and second essentially horizontal forces (P1; P2) simultaneously.

10. A method for separation of heterogeneous products included in household waste (HW), wherein household waste (HW) including said products is conveyed to a fractionation vessel containing a liquid, and in that the products are separated in the fractionation vessel, the waste including components, of which at least some are floatable in the liquid, whereby the components at least include first components having a first buoyancy in the liquid and second components having a second buoyancy in the liquid, the first buoyancy being different from the second buoyancy; wherein said heterogeneous products include components from at least some of the following fractions:

F0: components that are so heavy that they cannot float;
F1: components that are dissolvable or dispersible;
F2: components that are floatable with a major part thereof under the surface of the flowing liquid, but close to the surface;
F3: components that are floatable with major part thereof under the surface of the flowing liquid and reach deeper under the surface than F2;
F4: components that are floatable with a substantial part thereof above and a substantial part below the surface of the flowing liquid;
F5: components that are floatable with a major part thereof above the surface;

and wherein the method comprises:
exposing said components to a first essentially horizontal force (P1) in a first direction (D1) enforced by a flow of the liquid in the fractionation vessel and to a second essentially horizontal force (P2) in a second direction (D2), which is substantially different from the first direction (D1); and
the combined impact of the forces (P1; P2) on the components and the different buoyancies of the components causing the first and second components to be influenced by different resulting forces, so as to spread the first and second floating components and lead them to at least two respective collection areas;
wherein the heterogenous products include F3 and F4 components and wherein the F3 and F4 components are affected below the surface at one or several depths by third forces (P3) in a third direction (D3), which lead them to one or several collection areas along the liquid flow, whereby a collection area for F4 components is closer to a feeding area, at which components are fed into the fractionation vessel, than a collection area for F3 components.

11. A method according to claim 10, wherein the second force (P2) is applied above the surface of the liquid.

12. A method according to claim 10, wherein the second force (P2) is enforced by at least one of mechanical means, by one or more water jets and by an airflow.

13. A method according to claim 10, wherein one or several of the fractions, which have been lead to collection areas by said forces are separated further by collection devices.

14. A method according to claim 10, wherein one or several of the separated fractions are subsequently separated further.

15. A method according to claim 10, wherein a feeding system for feeding the components into the vessel comprises a dosing device arranged above the vessel, so that the components fall from the dosing device to the surface of the liquid, and wherein the components are exposed to an airflow or water jet in the second direction (D2) during the fall.

16. A method according to claim 10, wherein the heterogeneous products include F0-F5 components and wherein some of the liquid will be withdrawn together with the fractions F0-F5 and the rest of the liquid is recycled from a liquid outlet of the vessel back into a liquid inlet of the vessel.

17. A method according to claim 10, wherein
the F0 components include at least one of glass porcelain, batteries and kitchen utensils;
the F1 components include at least one of sugar, salt, tissue paper and food residues;
the F2 components include at least one of plastic foils and newspapers;
the F3 components include at least one of glass bottles and shoes;
the F4 components include at least one of glass jars with lid and cartons filled with other waste; and
the F5 components include at least one of empty plastic bottles and beer cans.

18. A method according to claim 17, wherein the first and second forces (P1; P2) act on those components, which are floatable in the liquid.

19. A method according to claim 18, wherein said components are exposed to the first and second essentially horizontal forces (P1; P2) simultaneously.

* * * * *